(12) United States Patent
Rodriguez, II

(10) Patent No.: US 12,153,221 B2
(45) Date of Patent: *Nov. 26, 2024

(54) DISPLAY DEVICES, METHODS AND EYEWEAR INCORPORATING DISPLAYS HAVING DIFFERENT GROUPS OF PIXELS EMITTING LIGHT AT DIFFERENT WAVELENGTHS

(71) Applicant: Snap Inc., Santa Monica, CA (US)

(72) Inventor: Jonathan M. Rodriguez, II, La Habra, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,527

(22) Filed: Feb. 27, 2023

(65) Prior Publication Data

US 2023/0221562 A1    Jul. 13, 2023

Related U.S. Application Data

(63) Continuation of application No. 17/486,055, filed on Sep. 27, 2021, now Pat. No. 11,604,357, which is a
(Continued)

(51) Int. Cl.
*G02B 27/01* (2006.01)
*G02F 1/1335* (2006.01)
(Continued)

(52) U.S. Cl.
CPC ..... *G02B 27/0172* (2013.01); *G02F 1/133553* (2013.01); *G02F 1/1336* (2013.01); *G02F 1/13439* (2013.01); *G09G 5/026* (2013.01); *G09G 5/10* (2013.01); *G09G 5/14* (2013.01); *G02B 2027/0178* (2013.01);
(Continued)

(58) Field of Classification Search
CPC .. G09G 5/10; G09G 5/14; G09G 5/02; G09G 5/026; G09G 5/18; G09G 2360/144; G09G 2300/0452; G09G 2300/026; G02F 1/1336; G02F 1/13439; G02F 1/133553; G02F 2203/12; G02F 2001/133616;
(Continued)

(56) References Cited

U.S. PATENT DOCUMENTS 6,724,354 B1    4/2004  Spitzer et al.
9,069,525 B2    6/2015  Mathew et al.
(Continued)

*Primary Examiner* — Darlene M Ritchie
(74) *Attorney, Agent, or Firm* — CM Law; Stephen J. Weed

(57) ABSTRACT

Displays and eyewear devices incorporating displays are disclosed. One display includes a light source, a first display region, and a second display region. The first display region includes a first contiguous array of pixels. The first contiguous array of pixels includes a first group of pixels and a second group of pixels interspersed with the first group of pixels. The first group of pixels is adapted to emit light from the light source in only a first wavelength band and the
(Continued)

second group of pixels is adapted to emit light from the light source in only a second wavelength band different from the first wavelength band. The second display region consists essentially of a second contiguous array of pixels. The second contiguous array of pixels is adapted to emit light from the light source in a predetermined wavelength band.

18 Claims, 4 Drawing Sheets

Related U.S. Application Data continuation of application No. 16/391,538, filed on Apr. 23, 2019, now Pat. No. 11,132,975.

(60) Provisional application No. 62/665,026, filed on May 1, 2018.

(51) Int. Cl.
| | |
|---|---|
| *G02F 1/13357* | (2006.01) |
| *G02F 1/1343* | (2006.01) |
| *G09G 5/02* | (2006.01) |
| *G09G 5/10* | (2006.01) |
| *G09G 5/14* | (2006.01) |

(52) U.S. Cl.
CPC .... *G02F 1/133616* (2021.01); *G02F 2203/12* (2013.01); *G09G 2300/0452* (2013.01); *G09G 2360/144* (2013.01)

(58) Field of Classification Search
CPC ........ G02B 27/0172; G02B 2027/0178; G06F 3/011; G06F 3/1446
See application file for complete search history.

(56) References Cited

U.S. PATENT DOCUMENTS

| | | |
|---|---|---|
| 9,606,383 B2 | 3/2017 | Kim et al. |
| 10,162,088 B2 | 12/2018 | Matsui et al. |
| 11,132,975 B1 | 9/2021 | Rodriguez |
| 11,604,357 B2 | 3/2023 | Rodriguez |
| 2005/0253778 A1 | 11/2005 | Ku et al. |
| 2006/0017671 A1 | 1/2006 | Yamada |
| 2009/0002265 A1 | 1/2009 | Kitaoka et al. |
| 2013/0154990 A1 | 6/2013 | Hamada |
| 2014/0132158 A1 | 5/2014 | Land et al. |
| 2015/0253487 A1 | 9/2015 | Nichol et al. |
| 2016/0033771 A1 | 2/2016 | Tremblay et al. |
| 2018/0151103 A1 | 5/2018 | Koudo et al. |
| 2018/0315384 A1 | 11/2018 | Ikeda et al. |
| 2019/0243175 A1 | 8/2019 | Newton |
| 2019/0331963 A1 | 10/2019 | Kim et al. |
| 2020/0349902 A1 | 11/2020 | Machida |

DISPLAY DEVICES, METHODS AND EYEWEAR INCORPORATING DISPLAYS HAVING DIFFERENT GROUPS OF PIXELS EMITTING LIGHT AT DIFFERENT WAVELENGTHS

CROSS-REFERENCE TO RELATED APPLICATIONS

This application is a Continuation of U.S. application Ser. No. 17/486,055 filed on Sep. 27, 2021, which is a Continuation of U.S. application Ser. No. 16/391,538 filed on Apr. 23, 2019, now U.S. Pat. No. 11,132,975, which claims priority to U.S. Provisional Patent Application No. 62/665,026 filed on May 1, 2018, the contents of all of which are incorporated fully herein by reference.

TECHNICAL FIELD

The present subject matter relates to display devices and methods, and more particularly, to near-eye displays for use in eyewear.

BACKGROUND

Portable eyewear devices such as smart glasses integrate displays to present information to the wearer. The integration of displays into eyewear presents a number of unique challenges. Such displays should avoid or minimize obstruction of the wearer's field of view when not actively presenting information. Nonetheless, such displays should present information in a clearly discernable and visually appealing fashion.

BRIEF DESCRIPTION OF THE DRAWINGS

The drawing figures depict one or more implementations, by way of example only, not by way of limitation. In the figures, like reference numerals refer to the same or similar elements.

DETAILED DESCRIPTION

Figure 1:
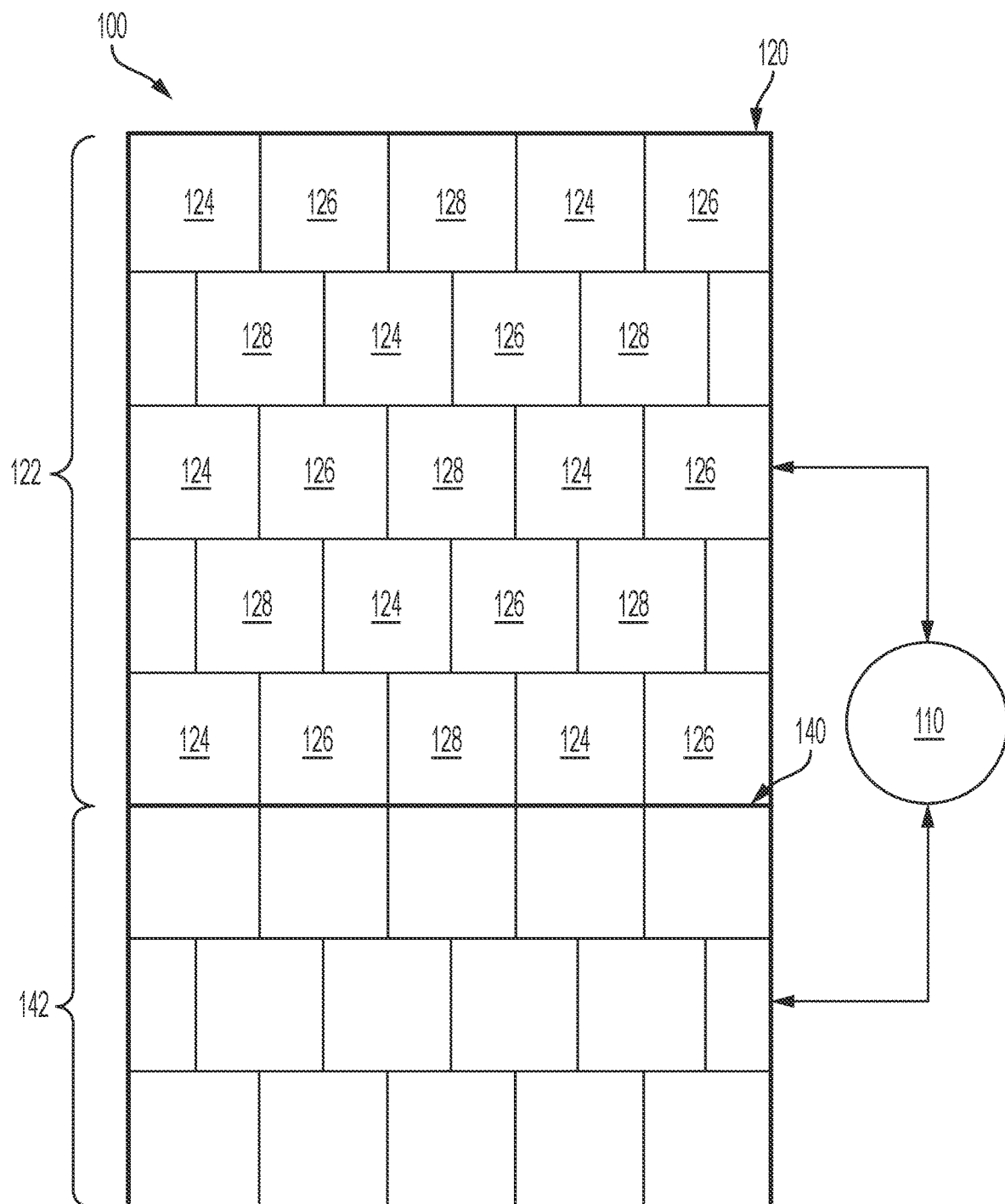
FIG. 1 depicts a diagram of a front view of an example display.

The following detailed description sets forth numerous specific details by way of examples in order to provide a thorough understanding of the relevant teachings. However, those skilled in the art will understand that they may practice the present teachings without such details. In other instances, the following sections describe well known methods, procedures, components, and circuitry at a relatively high-level, without detail, in order to avoid unnecessarily obscuring aspects of the present teachings.

The term "coupled" as used herein refers to any logical, optical, physical or electrical connection, link or the like by which signals or light produced or supplied by one system element travels to another coupled element. Unless otherwise described, coupled elements or devices need not be directly connected to one another and may be separated by intermediate components, elements or communication media that may modify, manipulate or carry the light or signals.

The term "emitted" as used herein with respect to light refers to any form of light transmission, including light generation or creation, pass-through, giving off, discharging, or other communication of light from one point to another. Unless otherwise described, components or elements that emit light need not necessarily generate the emitted light, but may emit light received from a separate light source.

The following sections describe and depict orientations of displays or eyewear devices or associated components by way of example only, for illustration and discussion purposes. In operation, the disclosed displays and eyewear devices can take any orientation or direction suitable to the particular application of the eyewear device, for example up, down, sideways, or any other orientation. Also, to the extent the follow sections use any directional term, such as front, rear, inwards, outwards, towards, left, right, lateral, longitudinal, up, down, upper, lower, top, bottom and side, those terms do not limit the direction or orientation of any optic or component of an optic constructed as otherwise described herein.

The following description sets forth additional objects, advantages and novel features of the examples. Those skilled in the art will readily appreciate such concepts upon examination of the following and the accompanying drawings, or may learn such concepts by production or operation of the examples. The methodologies, instrumentalities and combinations particularly pointed out in the appended claims may achieve the objects and advantages of the present subject matter set forth herein, and/or may achieve other additional and undisclosed objects or advantages.

In one example, a display includes a light source, a first display region, and a second display region. The first display region includes a first contiguous array of pixels. The first contiguous array of pixels includes a first group of pixels and a second group of pixels interspersed with the first group of pixels. The first group of pixels is adapted to emit light from the light source in only a first wavelength band and the second group of pixels is adapted to emit light from the light source in only a second wavelength band different from the first wavelength band. The second display region consists essentially of a second contiguous array of pixels. The second contiguous array of pixels is adapted to emit light from the light source in a predetermined wavelength band.

In another example, an eyewear device includes a frame and at least one panel. The frame defines a pair of openings. The panel is positioned in one of the pair of openings. The includes a display as described above.

The following description provides additional detail regarding the examples illustrated in the accompanying drawings.

FIG. 1 depicts a front view of a display 100. As a general overview, display 100 includes a light source 110 and multiple display regions 120 and 140. The following paragraphs set forth additional details of display 100.

Light source 110 generates light. Display 100 uses the light generated by light source 110 to display information, e.g., in display regions 120 and 140. Light source 110 may generate light in one or more separate wavelength bands, and/or may generate light across an entire visible light spectrum, e.g., as white light.

Suitable light generating elements for use as light source 110 include, for example, light emitting diodes (LEDs) of all types, including organic LEDs and micro LEDs, liquid crystal displays (LCDs), electroluminescent (EL) displays, plasma displays, lasers, and/or cathode ray tubes. Those skilled in the art will know of other light generation technologies usable to implement the light source 110.

Light source 110 may include a single light generating element, or may combine light from some number of light generating elements, e.g., as in an LED module. Where light source 110 includes multiple light generating elements, those elements may generate light having the same or different characteristic, such as intensity, correlated color temperature, or other light characteristics.

Display 100 includes separate display regions 120 and 140. As shown in FIG. 1, display regions 120 and 140 border one another. Display regions 120 and 140 may have the same or different areas. For example, display region 140 may have approximately 20%, 30%, 40%, 50%, 60%, 70%, 80%, 90%, or 100% the size of display region 120. Conversely, display region 120 may have approximately 20%, 30%, 40%, 50%, 60%, 70%, 80%, 90%, or 100% the size of display region 140. Display 100 need not have only two display regions, but may have any number and/or arrangement of display regions as desired to present information on display 100.

Display regions 120 and 140 comprise respective arrays of pixels 122 and 142, respectively. Display regions 120 and 140 may consist essentially of or consist only of pixel arrays 122 and 142. In other words, pixel arrays 122 and 142 at least substantially cover the entirety of their respective display regions 120 and 140, however, the display regions may or may not contain a relatively small number of other pixels that do not materially affect the basic and novel properties of the invention. Pixel arrays 122 and 142 can be contiguous arrays, i.e., the pixels in each array are adjacent one another. By selectively turning on individual pixels in pixel arrays 122 and 142, i.e. selectively emitting light from light source 110, display regions 120 and 140 present information to a viewer. The pixels of pixel arrays 122 and 142 all have the same size, as shown in FIG. 1.

Display regions 120 and 140 contain and/or consist of transparent or substantially transparent materials, such as glass, acrylic, and/or indium tin oxide (ITO), for example. Formation of transparent or substantially transparent display regions 120 and/or 140 may enable the use of display 100 as a near-eye display.

Pixel array 122 includes a first group of pixels 124, a second group of pixels 126, and a third group of pixels 128. Pixel groups 124, 126, and 128 are interspersed with one another, as shown in FIG. 1. In one example, pixel array 122 includes a plurality of pixel rows, with the pixels of pixel groups 124, 126, and 128 alternatingly arranged in each pixel row. In a particular example, pixel groups 124, 126, and 128 are arranged such that no pixel in pixel group 124 borders another pixel in pixel group 124; no pixel in pixel group 126 borders another pixel in pixel group 126, and no pixel in pixel group 128 borders another pixel in pixel group 128.

The pixels in pixel group 124 emit light from light source 110 in only a first wavelength band; the pixels in pixel group 126 emit light from light source 110 in only a second wavelength band; the pixels in pixel group 128 emit light from light source 110 in only a third wavelength band. The first, second, and third wavelength bands differ from one another. The wavelength bands may overlap with one another or may include no overlap. In one example, the first wavelength band includes a blue light band, the second wavelength band includes a green light band, and the third wavelength band includes a red light band.

The pixels in pixel array 142 emit light from light source 110 in a predetermined wavelength band. The predetermined wavelength band may match one of the first, second, or third wavelength bands, or may differ therefrom. The predetermined wavelength band may include one or more of the first, second, and third wavelength bands. In one example, in which pixel array 142 emits substantially white light, the predetermined wavelength band includes blue, green, and red wavelength bands.

Display 100 may employ any process or structure for directing light from light source 110 to pixel arrays 122 and 142. Light source 110 may emit light directly through the pixels of pixel arrays 122 and 142. Alternatively, display 100 may include components which modulate and/or redirect light from light source 110 before the light passes through the pixels of pixel arrays 122 and 142.

Figure 2:
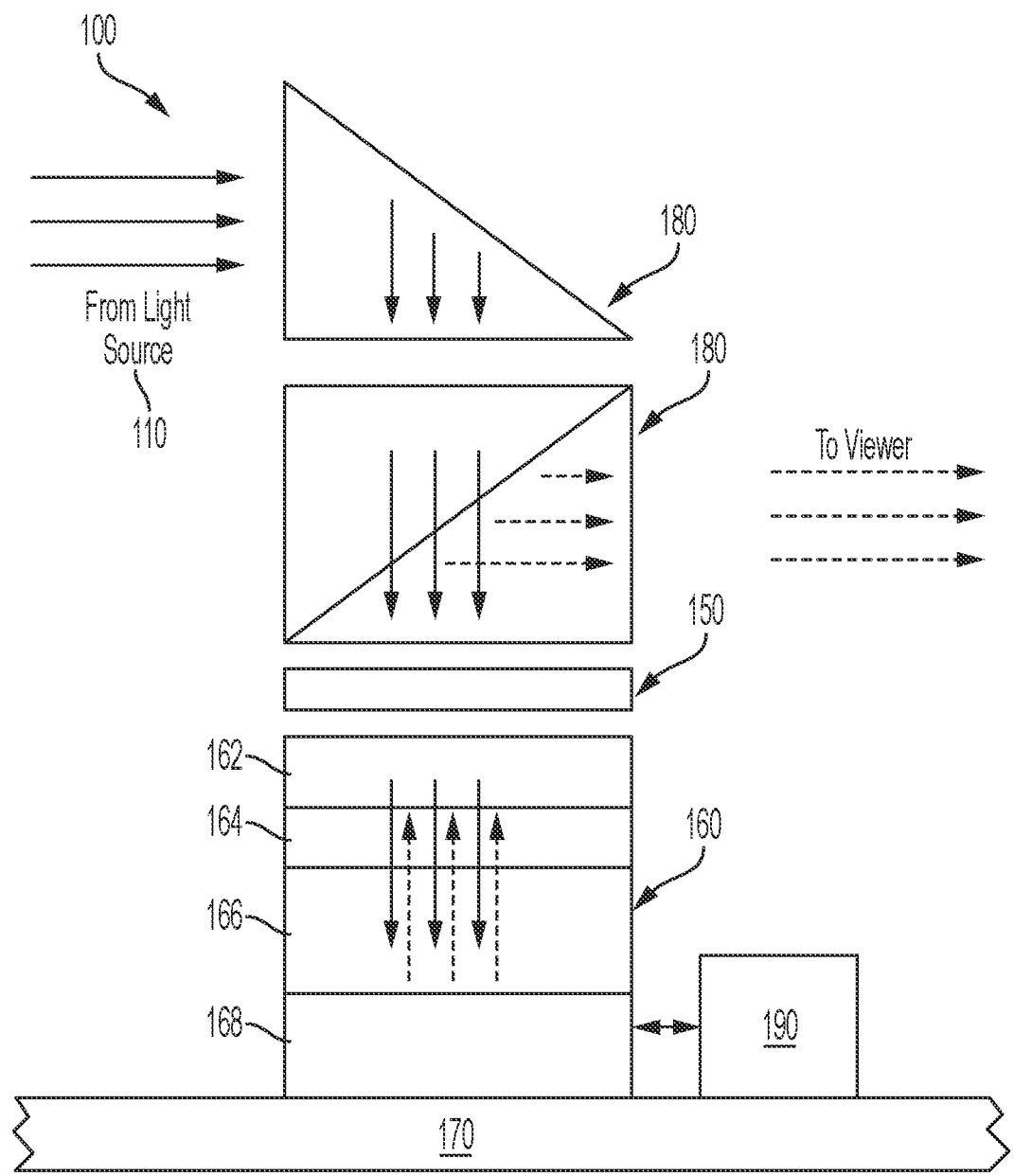
FIG. 2 depicts a diagram of a cross-sectional view of the display of FIG. 1.

FIG. 2 depicts a cross-sectional view of a portion of display 100. FIG. 2 shows one example for directing light from light source 110 to one of pixel groups 124, 126, and 128. Each of pixel groups 124, 126, and 128 may include a respective set of the components of FIG. 2 described below. In the example of FIG. 2, display 100 further includes a filter 150, a spatial light modulator 160, and a controller 190. The following paragraphs set forth additional details of this example of display 100.

Filter 150 filters the light from light source 110. Filter 150 filters light from light source 110 to block light outside of the respective wavelength band of the pixel group 124, 126, or 128 which receives light via filter 150. For example, filter 150 may allow only blue light to pass on to pixel group 124; only green light to pass on to pixel group 126; or only red light to pass on to pixel group 128.

Spatial light modulator 160 modulates the light from light source 110. Modulator 160 controls the amount or intensity of light reaching the associated pixel group 124, 126, or 128. Modulator 160 may control the amount of intensity of light in a binary or variable (stepwise or continuously variable) fashion. Modulator 160 separately modulates light to each of the pixels in the associated pixel group 124, 126, or 128. In this respect, modulator 160 has a resolution corresponding to the sum of the number of pixels in the associated pixel group 124, 126, or 128.

Those skilled in the art will know of suitable spatial light modulators for use as modulator 160. As one example, spatial light modulator 160 is a liquid crystal over silicon (LCOS) modulator, as shown in FIG. 2. The LCOS modulator 160 includes a transparent front electrode 162, at least one alignment layer 164, a liquid crystal element 166, a rear reflector 168, and a silicon substrate 170. Light travels in through the transparent front electrode 162, the alignment layer 164, and the liquid crystal element 166, reflects off of rear reflector 168, and travels out through liquid crystal element 166, alignment layer 164, and transparent front electrode 162. To modulate the light, front electrode 162 and circuitry in the silicon substrate 170 apply a voltage across liquid crystal element 166.

Display 100 may further include a beam steering element 180. Beam steering element 180 directs light from light source 110 to modulator 160, and/or directs light modulated by modulator 160 to the viewer's eye. Beam steering element 180 may comprise a beam splitter to separate input light to modulator 160 from output light from modulator 160. Beam steering element 180 may include one or more reflectors, refractors, focusing elements, or dispersive elements, depending on the design of display 100. In addition to or in combination with beam steering element 180, display 100 may further include one or more polarizing elements to polarize the light, and/or one or more antireflective coatings to minimize reflections, in order to improve visibility of images on display 100. Suitable beam steering elements include, for example, mirrors or prisms.

Pixel array 142 may also use a set of one or more of the components of FIG. 2 to receive light from light source 110. Pixel array 142 may have an associated spatial modulator 160 to control the amount or intensity of light emitted by pixel array 142. Pixel array 142 may have an associated filter 150 to filter light from light source 110. Alternatively, where the predetermined wavelength band of pixel array 142 corresponds to the range of wavelengths emitted by light source 110 (e.g., when using a white light source as light source 110), then filter 150 may be omitted from the path of light from light source 110 to pixel array 142.

Figure 3:
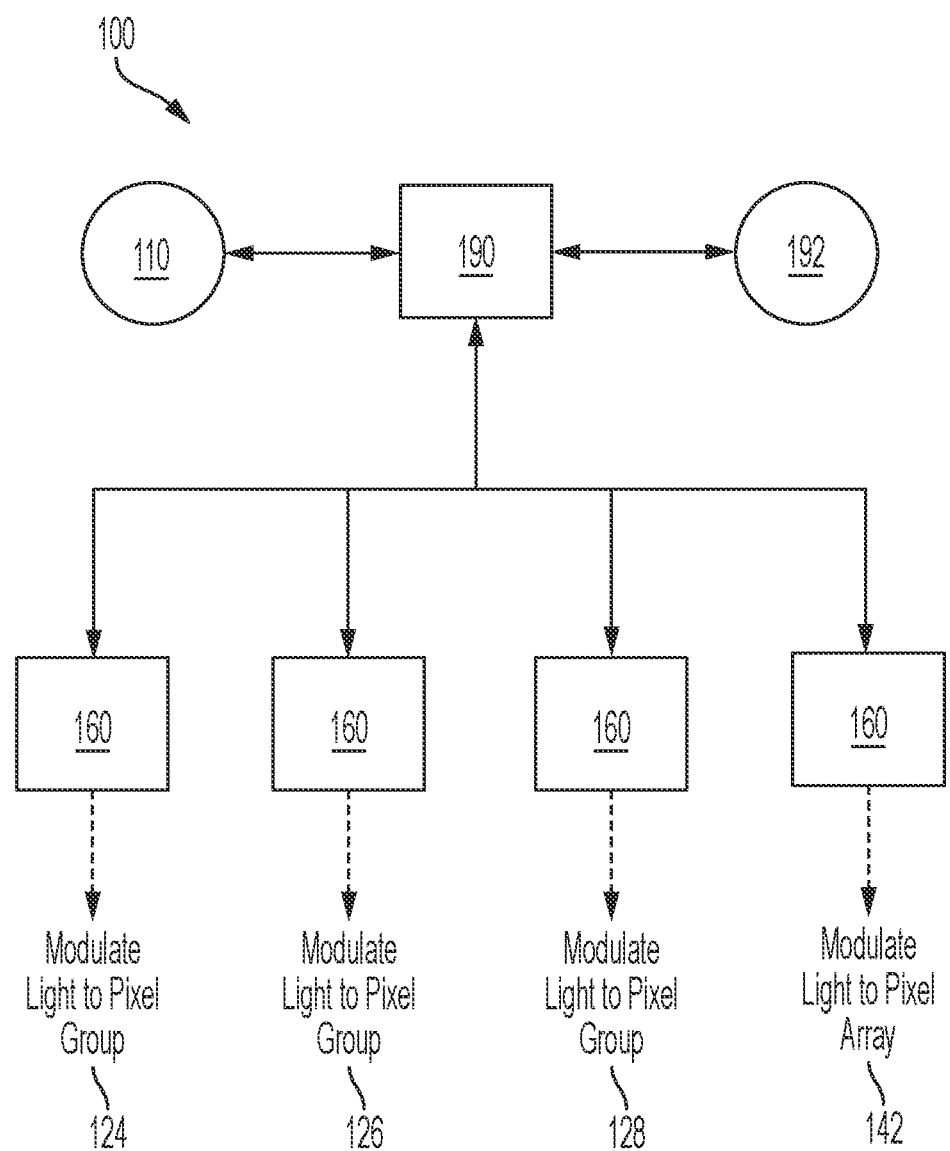
FIG. 3 depicts a functional block diagram of the display of FIG. 1.

Controller 190 controls the operation of display 100. FIG. 3 shows operative connections between controller 190 and the remaining components of display 100. As shown in FIG. 3, controller 190 controls the operation of light source 110 and operation of each spatial light modulator 160. Controller 190 controls the operation of light source 110 and modulators 160, e.g., to generate a desired image in the first and second display regions 120 and 140. Controller 190 may take the form of a single master controller performing the operations recited herein, as shown in FIG. 3, or may take a distributed form as a number of separate control elements.

Display 100 may further include an ambient light sensor 192 in communication with controller 190. Ambient light sensor 192 senses an ambient light level in a region of the display 100. Those skilled in the art will know of suitable sensors for use as ambient light sensor 192.

Controller 190 controls an intensity of light emitted by light source 110 or received by pixel groups 124, 126, 128 or pixel array 142 based on an ambient light level sensed by ambient light sensor 192. In one example, when the ambient light level lies below a predetermined value, controller 190 controls the intensity of light emitted by light source 110 or received by pixel groups 124, 126, 128 or pixel array 142 so that the intensity of the pixels in pixel array 122 approximately matches (e.g., plus/minus 10%) the intensity of the pixels in pixel array 142, and/or the intensity of light emitted from display region 120 approximately matches (e.g., plus/minus 10%) the intensity of light emitted from display region 140. Conversely, when the ambient light level exceeds a predetermined value, controller 190 controls the intensity of light emitted by light source 110 or received by pixel groups 124, 126, 128 or pixel array 142 so that the intensity of the pixels in pixel array 142 exceeds (e.g., by more than 10%) the intensity of the pixels in pixel array 122, and/or the intensity of light emitted from display region 140 exceeds (e.g., by more than 10%) the intensity of light emitted from display region 120.

The above-described components of display 100 may all form part of a single device, substantially as shown in FIGS. 1-3. Those skilled in the art will understand that such a self-contained display 100 may include additional components not described herein, e.g., a power supply, a memory, and/or other components.

Alternatively, the components of display 100 may be distributed across multiple separate structures. For example, light source 110 and display regions 120 and 140 are separate, and light source 110 conveys light to display regions 120 and 140 either through the air or via one or more light guides. For another example, controller(s) 190 and spatial modulators 160 are separate, and controller 190 controls these components via wired or wireless transmissions. Those skilled in the art will appreciate other arrangements of the components of display 100.

According to the above examples, display region 120 includes groups of pixels configured to emit different wavelength bands of light, whereas display region 140 may include an array of pixels configured to emit a single wavelength band of light. In these examples, display 100 may combine the different wavelength bands of light emitted in display region 120 to create full color or approximately full color images in display region 120. For example, display 100 may combine a respective blue, green, and red pixel in pixel array 122 to form a full-color point or dot of the image. Conversely, display 100 may utilize a monochrome pixel array 142 in region 140 to create images having a higher resolution, due to the absence of any need to combine multiple pixels in pixel array 142 to form a single image point or dot. Likewise, display 100 may create brighter images in display region 140, due to the absence of any need for a filter between the light source 110 and pixel array 142.

Figure 4A:
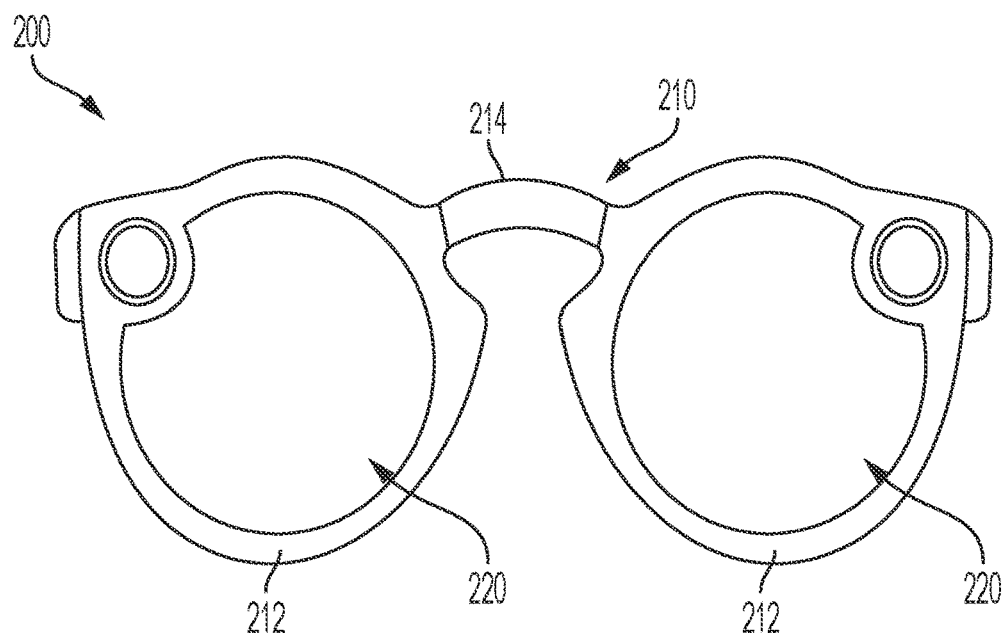
FIGS. 4A and 4B depict a diagram of a perspective view of an eyewear device including the display of FIG. 1.
Figure 4B:
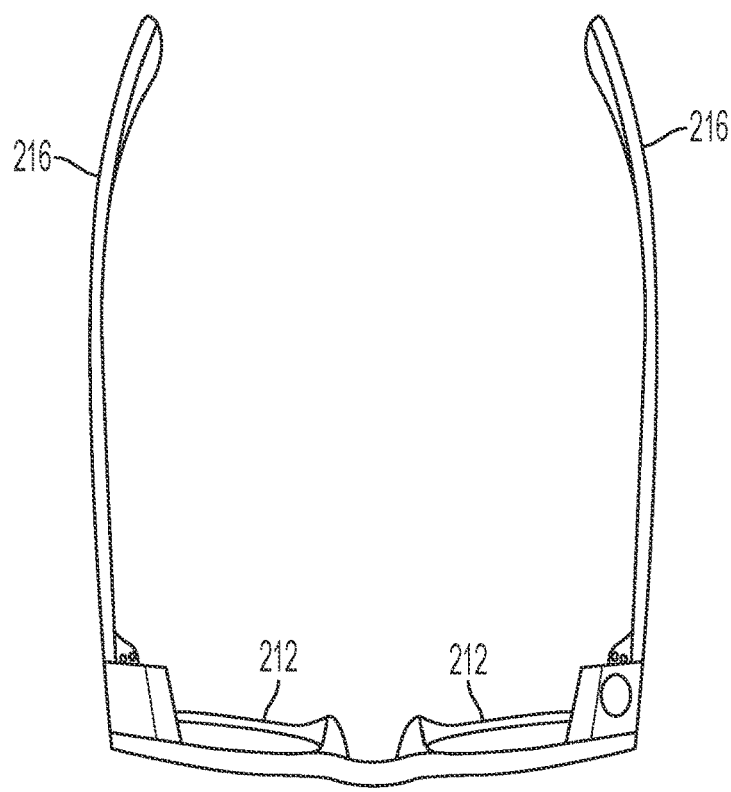

FIGS. 4A and 4B a perspective view of an eyewear device 200. As a general overview, eyewear device 200 includes a frame 210 and one or more panels 220. The following paragraphs set forth additional details of eyewear device 200.

Frame 210 includes a pair of rims 212 which define respective openings. The openings defined by rims 212 sit in front of a user's eyes when the user wears eyewear device 200. Rims 212 may completely surround or encircle their respective openings, as shown in FIG. 4A, or may only partially surround or encircle their respective openings.

Frame 210 may further include a bridge 214 connecting between rims 212, and a pair of arms 216 extending from respective rims 212. Bridge 214 sits in place on the upper part of a user's nose when the user wears eyewear device 200. Arms 216 extend along the sides of the user's head, and may rest on the user's ears, when the user wears eyewear device 200. Arms 216 may rigidly connect to rims 212, or may connect to rims 212 via hinges to enable folding of arms 216.

Panels 220 are positioned within respective ones of the openings defined by rims 212 of frame 210. Panels 220 cover an area in front of the user's eyes when the user wears eyewear device 200.

At least one of the panels 220 is a waveguide coupled to a respective display 100. Further, in this example, portions of frame 210, e.g., rims 212, bridge 214, and/or arms 216, may support and/or house components of display 100, including for example, light source 110, controller 190, and/or a power supply of display 100. The waveguide may be, for example, diffractive, holographic, or reflective. Suitable material for forming a panel 220 as a waveguide will be known from the description herein Where only one panel 220 is coupled to a display 100, the other panel 220 may take any other form, or may be omitted. Alternative panels 220 may contain or consist of transparent, translucent, or tinted materials, and/or may take the form of a lens, if desired.

Those skilled in the art will understand that the terms and expressions used herein have the ordinary meaning accorded to such terms and expressions with respect to their corresponding respective areas of inquiry and study except where this description otherwise sets forth specific meanings. Relational terms such as first and second and the like solely distinguish one entity or action from another, and do not necessarily require or imply any actual such relationship or order between such entities or actions. The terms "comprises," "comprising," "includes," "including," or any other variation thereof, cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications set forth in this specification, including in the claims that follow, are approximate, not exact. Such amounts have a reasonable range consistent with the functions to which they relate and with any customary understanding in the art to which they pertain. For example, unless expressly stated otherwise, a parameter value or the like may vary by as much as ±10% from the stated amount.

In addition, the foregoing description group various features together in various examples for the purpose of streamlining the disclosure. This method of disclosure does not reflect an intention that the claimed examples require more features than those expressly recited in each claim. Rather, as the following claims reflect, the subject matter protected lies in less than all features of any single disclosed example. Thus, the Detailed Description hereby incorporates the following listing of claims, with each claim standing on its own as a separately claimed subject matter.

While the foregoing description includes that which is considered the best mode and other examples, the description sets forth only some of all possible and various modifications contemplated. Those skilled in the art may implement the subject matter disclosed herein in various forms and examples, and may apply the subject matter disclosed herein in numerous applications. The following claims cover any and all modifications and variations that fall within the true scope of the present concepts.

The invention claimed is:

1. A display comprising:
   a light source;
   a display region comprising an array of pixels, the array of pixels including a first group of pixels, a second group of pixels, and a third group of pixels interspersed with the first group of pixels, the first group of pixels adapted to emit light from the light source in a first wavelength band, the second group of pixels adapted to emit light from the light source in a second wavelength band, and the third group of pixels adapted to emit light from the light source in a third wavelength band, wherein the first, second, and third wavelength bands are different and wherein the array of pixels comprises a plurality of pixel rows, and the first, second, and third groups of pixels are alternatingly arranged in each of the plurality of pixel rows;
   another display region separate from the display region and comprising another array of pixels;
   at least one filter positioned between the light source and the display region, the at least one filter configured to filter light from the light source;
   a spatial light modulator configured to modulate light from the light source;
   a beam steering element configured to direct light from the light source to the spatial light modulator; and
   another beam steering element configured to direct light from the spatial light modulator toward a viewing area.

2. The display of claim 1, wherein the display region and the other display region border one another.

3. The display of claim 1, wherein the the first, second, and third groups of pixels are alternatingly arranged in each of the plurality of pixel rows.

4. The display of claim 1, wherein the other array of pixels is configured to emit light from the light source in the first, second, and third wavelength bands.

5. The display of claim 1, wherein the first wavelength band comprises a blue light band, the second wavelength band comprises a green light band, and the third wavelength band comprises a red light band.

6. The display of claim 5, wherein the other array of pixels are configured to emit light from the light source in a white light wavelength band.

7. The display of claim 1, wherein the first, second, and third groups of pixels are arranged such that no pixel in the first group borders another pixel in the first group, no pixel in the second group borders another pixel in the second group, and no pixel in the third group borders another pixel in the third group.

8. The display of claim 1, wherein the spatial light modulator comprises a liquid crystal modulator.

9. The display of claim 1, further comprising a controller configured to control the light source and each of the spatial light modulators to generate a desired image in the display region and the other display region.

10. The display of claim 9, further comprising an ambient light sensor in communication with the controller, the ambient light sensor configured to sense an ambient light level in a region of the display.

11. The display of claim 10, the controller further configured to adjust an intensity of the light emitted by the other array of pixels based on the ambient light level sensed by the ambient light sensor.

12. The display of claim 1, wherein the pixels of the array of pixels and the other array of pixels have the same size.

13. The display of claim 1, further comprising a beam splitter configured to separate input light to the spatial light modulator from output light from the spatial light modulator.

14. An eyewear device including:
   a frame defining at least one opening; and
   the display of claim 1, wherein the frame supports the light source of the display.

15. The eyewear device of claim 14, wherein the at least one opening comprises a pair of openings.

16. A display method comprising:
   generating light with a light source;
   directing the light from the light source toward a spatial light modulator,
   filtering and modulating the light;
   emitting light in a first wavelength band from a first group of pixels of an array of pixels in a display region;
   emitting light in a second wavelength band from a second group of pixels of the array of pixels in the display region; and
   emitting light in a third wavelength and from a third group of pixels of the array of pixels in the display region, the first, second, and third groups of pixels interspersed within the display region, wherein the first second, and third wavelength bands are different and wherein the array of pixels comprises a plurality of pixel rows and the first, second, and third groups of pixels are alternatingly arranged in each of the plurality of pixel rows;
   emitting light from a fourth group of pixels in another display region separate from the display region and comprising another array of pixels; and
   directing the light from the spatial light modulator toward a viewing area.

17. The method of claim 16, further comprising:
separating input light to the spatial light modulator from output light from the spatial light modulator.

18. The method of claim 16, further comprising:
controlling the light source and the spatial light modulators to generate a desired image in the other display region.

* * * * *